(12) United States Patent
Murrah

(10) Patent No.: US 7,760,095 B2
(45) Date of Patent: Jul. 20, 2010

(54) CONTEXT-DRIVEN RFID TAG AND SYSTEM CONTENT

(75) Inventor: Judith Murrah, Saint James, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 588 days.

(21) Appl. No.: 11/639,237

(22) Filed: Dec. 15, 2006

(65) Prior Publication Data

US 2008/0143532 A1 Jun. 19, 2008

(51) Int. Cl.
*G08B 13/14* (2006.01)

(52) U.S. Cl. .............................. 340/572.1; 340/825.49

(58) Field of Classification Search ............. 340/572.1, 340/572.4, 539.11, 572.8, 539.13, 825.49; 700/214, 215, 225
See application file for complete search history.

(56) References Cited

U.S. PATENT DOCUMENTS

| | | | |
|---|---|---|---|
| 5,774,876 A * | 6/1998 | Woolley et al. | 340/572.1 |
| 5,892,441 A * | 4/1999 | Woolley et al. | 340/825.49 |
| 5,959,568 A * | 9/1999 | Woolley | 340/572.1 |
| 6,812,824 B1 * | 11/2004 | Goldinger et al. | 340/825.69 |
| 7,180,422 B2 * | 2/2007 | Milenkovic et al. | 340/572.4 |
| 7,205,897 B2 * | 4/2007 | Lin | 340/572.1 |
| 7,299,068 B1 * | 11/2007 | Halla et al. | 340/572.1 |
| 7,307,523 B2 * | 12/2007 | Kister et al. | 340/539.13 |
| 7,366,806 B2 * | 4/2008 | Milenkovic et al. | 340/572.1 |
| 7,482,920 B2 * | 1/2009 | Joao | 340/539.11 |
| 2005/0134461 A1 * | 6/2005 | Gelbman et al. | 340/572.8 |
| 2008/0303637 A1 * | 12/2008 | Gelbman et al. | 340/572.8 |

* cited by examiner

*Primary Examiner*—John A Tweel, Jr.
(74) *Attorney, Agent, or Firm*—Glenn Frankenberger; Bartholomew J. DiVita; Michael Giannetta

(57) ABSTRACT

Methods and apparatuses for tracking an item having an associated radio frequency identification (RFID) tag are described. A change in a physical attribute of the item is detected. Information stored in the tag is updated based on the detected change. Information stored in a database may also be updated based on the detected change. In another aspect, a second tag associated with a person is determined to be located within a predetermined range of a first tag associated with an item. As a result, information is stored in the first tag regarding the person.

25 Claims, 9 Drawing Sheets

CONTEXT-DRIVEN RFID TAG AND SYSTEM CONTENT

BACKGROUND OF THE INVENTION

1. Field of the Invention

The present invention relates to identifiable radio frequency identification (RFID) devices and systems.

2. Background Art

Radio frequency identification (RFID) tags are electronic devices that may be affixed to items whose presence is to be detected and/or monitored. The presence of an RFID tag, and therefore the presence of the item to which the tag is affixed, may be checked and monitored wirelessly by devices known as "readers." Readers typically have one or more antennas transmitting radio frequency signals to which tags respond. Since the reader "interrogates" RFID tags, and receives signals back from the tags in response to the interrogation, the reader is sometimes termed as "reader interrogator" or simply "interrogator".

In a RFID system, typically a reader transmits a continuous wave (CW) or modulated radio frequency (RF) signal to a tag. The tag receives the signal, and responds by modulating the signal, "backscattering" an information signal to the reader. The reader receives signals back from the tag, and the signals are demodulated, decoded and further processed.

With the maturation of RFID technology, efficient communications between tags and readers has become a key enabler in supply chain management, especially in manufacturing, shipping, and retail industries, as well as in building security installations, healthcare facilities, libraries, airports, warehouses etc.

Currently, updating data stored in RFID tags and/or in databases related to the tags is a difficult process. What is needed are simplified ways of updating data stored in RFID tags and related databases.

BRIEF SUMMARY OF THE INVENTION

Methods, systems, and apparatuses are provided for tracking items having associated RFID tags, and for updating information based on a physical context of the items.

In an aspect of the present invention, an item having an associated radio frequency identification (RFID) tag is tracked. A change in a physical attribute of the item is detected. Information stored in the tag is updated based on the detected change. Information stored in a database may also be updated based on the detected change.

In an example aspect, a system for tracking an item having an associated RFID tag includes a monitor system and a RFID communication device. The monitor system is configured to detect a change in a physical attribute of the item. The RFID communication device is coupled to the monitor system and is configured to update a first information stored in the tag based on the detected change. In a further aspect, the tracking system may include a network communication device coupled to the monitor module that is configured to update a second information stored in a database based on the detected change.

In another aspect of the present invention, tag-related data may be generated/updated based on a proximity of person with a tag associated with an item. A second tag associated with a person is determined to be located within a predetermined range of the first tag. As a result, information is stored in the first tag regarding the person.

In an example aspect, a system for obtaining information related to an item having an associated tag includes a monitor module and a RFID communication device. The monitor module is configured to determine whether a second tag associated with a person is located within a predetermined range of the first tag. The RFID communication device is coupled to the monitor module and is configured to transmit information regarding the person to the first tag if the second tag is determined to be within the predetermined range.

These and other advantages and features will become readily apparent in view of the following detailed description of the invention. Note that the Summary and Abstract sections may set forth one or more, but not all exemplary embodiments of the present invention as contemplated by the inventor(s).

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
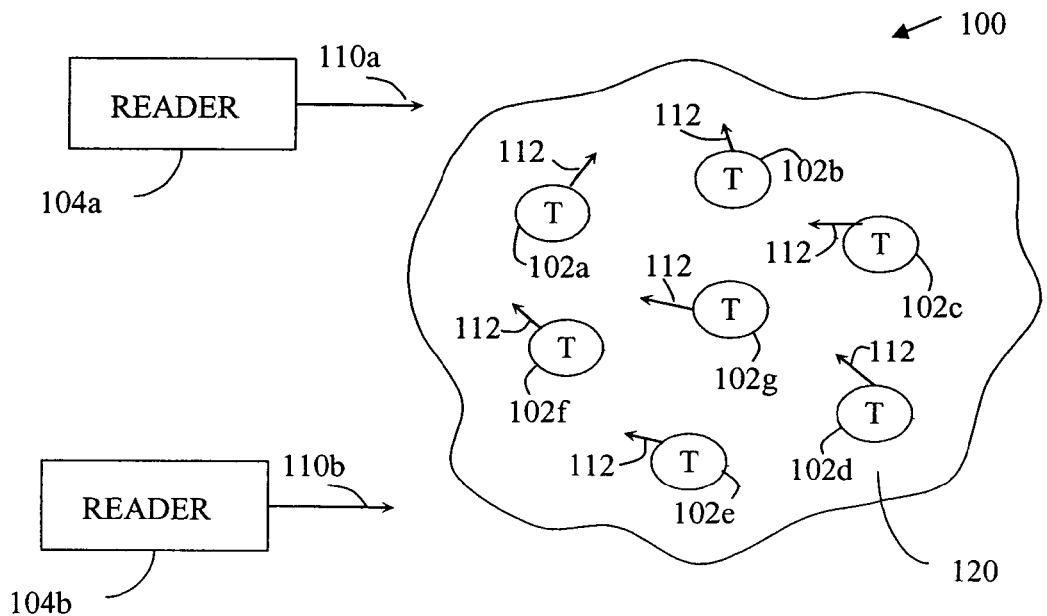
FIG. 1 illustrates an environment where RFID readers communicate with an exemplary population of RFID tags, according to an embodiment of the present invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner. Likewise, particular bit values of "0" or "1" (and representative voltage values) are used in illustrative examples provided herein to represent data for purposes of illustration only. Data described herein can be represented by either bit value (and by alternative voltage values), and embodiments described herein can be configured to operate on either bit value (and any representative voltage value), as would be understood by persons skilled in the relevant art(s).

Example RFID System Embodiment

Before describing embodiments of the present invention in detail, it is helpful to describe an example RFID communications environment in which the invention may be implemented. FIG. 1 illustrates an environment 100 where RFID tag readers 104 communicate with an exemplary population 120 of RFID tags 102. As shown in FIG. 1, the population 120 of tags includes seven tags 102a-102g. A population 120 may include any number of tags 102.

Environment 100 includes any number of one or more readers 104. For example, environment 100 includes a first reader 104a and a second reader 104b. Readers 104a and/or 104b may be requested by an external application to address the population of tags 120. Alternatively, reader 104a and/or reader 104b may have internal logic that initiates communication, or may have a trigger mechanism that an operator of a reader 104 uses to initiate communication. Readers 104a and 104b may also communicate with each other in a reader network.

As shown in FIG. 1, reader 104 transmits an interrogation signal 110 having a carrier frequency to the population of tags 120. Reader 104 typically operates in one or more of the frequency bands allocated for this type of RF communication. For example, frequency bands of 902-928 MHz and 2400-2483.5 MHz have been defined for certain RFID applications by the Federal Communication Commission (FCC).

Various types of tags 102 may be present in tag population 120 that transmit one or more response signals 112 to an interrogating reader 104, including by alternatively reflecting and absorbing portions of signal 110 according to a time-based pattern or frequency. This technique for alternatively absorbing and reflecting signal 110 is referred to herein as backscatter modulation. Reader 104 receives and obtains data from response signals 112, such as an identification number of the responding tag 102. In the embodiments described herein, a reader may be capable of communicating with tags 102 according to any suitable communication protocol, including Class 0, Class 1, EPC Gen 2, other binary traversal protocols and slotted aloha protocols, any other protocols mentioned elsewhere herein, and future communication protocols.

Figure 2:
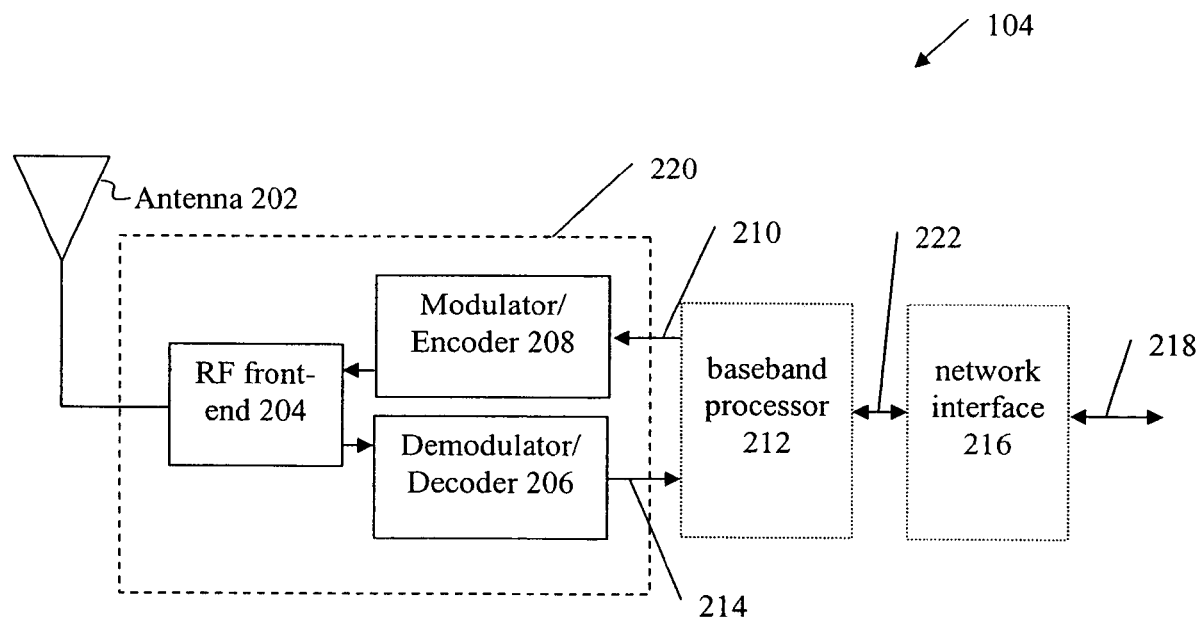
FIG. 2 shows a block diagram of an example RFID reader.

FIG. 2 shows a block diagram of an example RFID reader 104. Reader 104 includes one or more antennas 202, a receiver and transmitter portion 220 (also referred to as transceiver 220), a baseband processor 212, and a network interface 216. These components of reader 104 may include software, hardware, and/or firmware, or any combination thereof, for performing their functions.

Baseband processor 212 and network interface 216 are optionally present in reader 104. Baseband processor 212 may be present in reader 104, or may be located remote from reader 104. For example, in an embodiment, network interface 216 may be present in reader 104, to communicate between transceiver portion 220 and a remote server that includes baseband processor 212. When baseband processor 212 is present in reader 104, network interface 216 may be optionally present to communicate between baseband processor 212 and a remote server. In another embodiment, network interface 216 is not present in reader 104.

In an embodiment, reader 104 includes network interface 216 to interface reader 104 with a communications network 218. As shown in FIG. 2, baseband processor 212 and network interface 216 communicate with each other via a communication link 222. Network interface 216 is used to provide an interrogation request 210 to transceiver portion 220 (optionally through baseband processor 212), which may be received from a remote server coupled to communications network 218. Baseband processor 212 optionally processes the data of interrogation request 210 prior to being sent to transceiver portion 220. Transceiver 220 transmits the interrogation request via antenna 202.

Reader 104 has at least one antenna 202 for communicating with tags 102 and/or other readers 104. Antenna(s) 202 may be any type of reader antenna known to persons skilled in the relevant art(s), including a vertical, dipole, loop, Yagi-Uda, slot, or patch antenna type. For description of an example antenna suitable for reader 104, refer to U.S. Ser. No. 11/265,143, filed Nov. 3, 2005, titled "Low Return Loss Rugged RFID Antenna," now pending, which is incorporated by reference herein in its entirety.

Transceiver 220 receives a tag response via antenna 202. Transceiver 220 outputs a decoded data signal 214 generated from the tag response. Network interface 216 is used to transmit decoded data signal 214 received from transceiver portion 220 (optionally through baseband processor 212) to a remote server coupled to communications network 218. Baseband processor 212 optionally processes the data of decoded data signal 214 prior to being sent over communications network 218.

In embodiments, network interface 216 enables a wired and/or wireless connection with communications network 218. For example, network interface 216 may enable a wireless local area network (WLAN) link (including a IEEE 802.11 WLAN standard link), a BLUETOOTH link, and/or other types of wireless communication links. Communications network 218 may be a local area network (LAN), a wide area network (WAN) (e.g., the Internet), and/or a personal area network (PAN).

In embodiments, a variety of mechanisms may be used to initiate an interrogation request by reader 104. For example, an interrogation request may be initiated by a remote computer system/server that communicates with reader 104 over communications network 218. Alternatively, reader 104 may include a finger-trigger mechanism, a keyboard, a graphical user interface (GUI), and/or a voice activated mechanism with which a user of reader 104 may interact to initiate an interrogation by reader 104.

In the example of FIG. 2, transceiver portion 220 includes a RF front-end 204, a demodulator/decoder 206, and a modulator/encoder 208. These components of transceiver 220 may include software, hardware, and/or firmware, or any combination thereof, for performing their functions. Example description of these components is provided as follows.

Modulator/encoder 208 receives interrogation request 210, and is coupled to an input of RF front-end 204. Modulator/ encoder 208 encodes interrogation request 210 into a signal format, modulates the encoded signal, and outputs the modulated encoded interrogation signal to RF front-end 204. For example, pulse-interval encoding (PIE) may be used in a Gen 2 embodiment. Furthermore, double sideband amplitude shift keying (DSB-ASK), single sideband amplitude shift keying (SSB-ASK), or phase-reversal amplitude shift keying (PR-ASK) modulation schemes may be used in a Gen 2 embodiment. Note that in an embodiment, baseband processor 212 may alternatively perform the encoding function of modulator/encoder 208.

RF front-end 204 may include one or more antenna matching elements, amplifiers, filters, an echo-cancellation unit, a down-converter, and/or an up-converter. RF front-end 204 receives a modulated encoded interrogation signal from modulator/encoder 208, up-converts (if necessary) the interrogation signal, and transmits the interrogation signal to antenna 202 to be radiated. Furthermore, RF front-end 204 receives a tag response signal through antenna 202 and down-converts (if necessary) the response signal to a frequency range amenable to further signal processing.

Demodulator/decoder 206 is coupled to an output of RF front-end 204, receiving a modulated tag response signal from RF front-end 204. In an EPC Gen 2 protocol environment, for example, the received modulated tag response signal may have been modulated according to amplitude shift keying (ASK) or phase shift keying (PSK) modulation techniques. Demodulator/decoder 206 demodulates the tag response signal. For example, the tag response signal may include backscattered data formatted according to FM0 or Miller encoding formats in an EPC Gen 2 embodiment. Demodulator/decoder 206 outputs decoded data signal 214. Note that in an embodiment, baseband processor 212 may alternatively perform the decoding function of demodulator/decoder 206.

Figure 3:
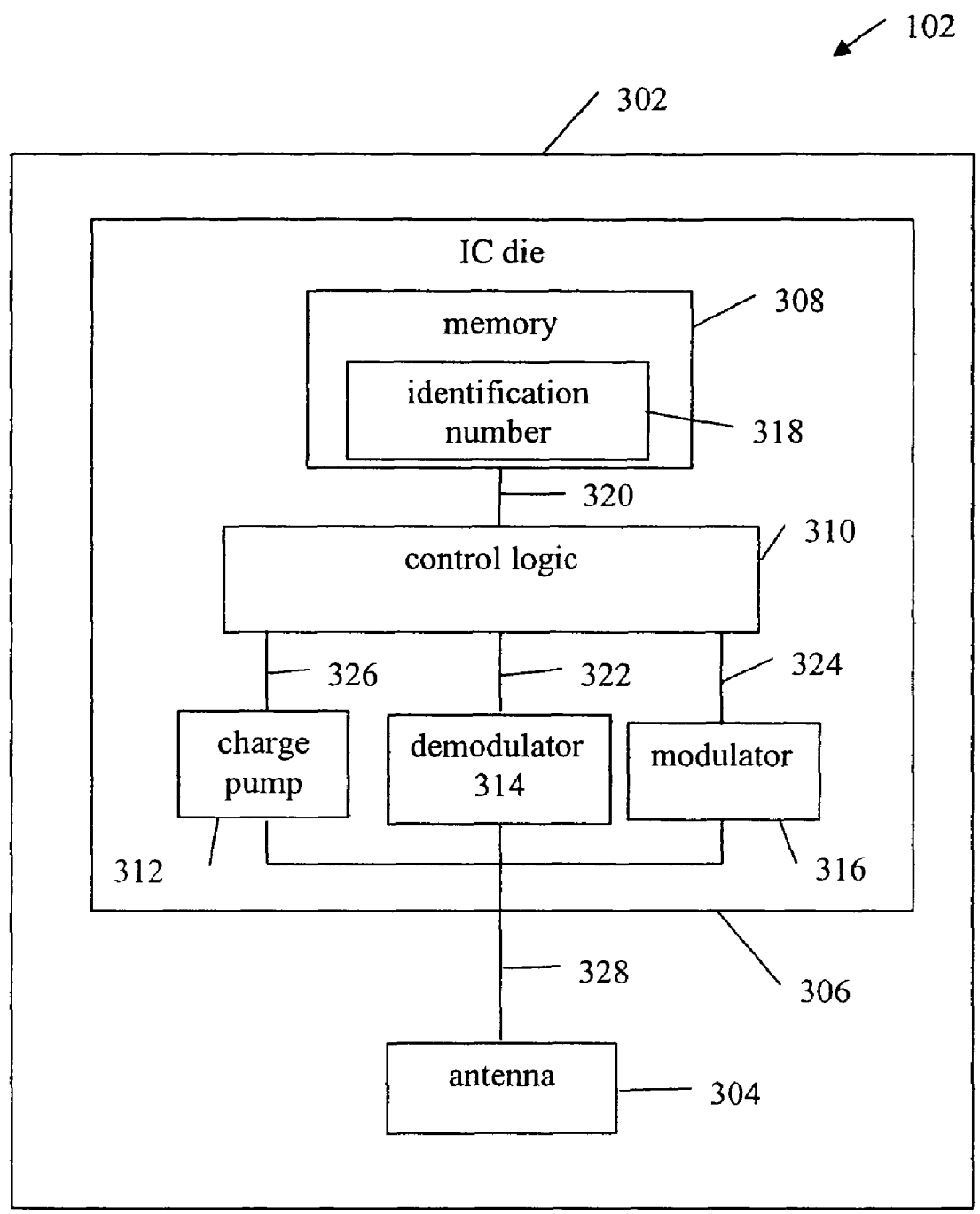
FIG. 3 shows a block diagram of an example RFID tag.

The present invention is applicable to any type of RFID tag. FIG. 3 shows a plan view of an example radio frequency identification (RFID) tag 102. Tag 102 includes a substrate 302, an antenna 304, and an integrated circuit (IC) 306. Antenna 304 is formed on a surface of substrate 302. Antenna 304 may include any number of one, two, or more separate antennas of any suitable antenna type, including dipole, loop, slot, or patch antenna type. IC 306 includes one or more integrated circuit chips/dies, and can include other electronic circuitry. IC 306 is attached to substrate 302, and is coupled to antenna 304. IC 306 may be attached to substrate 302 in a recessed and/or non-recessed location.

IC 306 controls operation of tag 102, and transmits signals to, and receives signals from RFID readers using antenna 304. In the example embodiment of FIG. 3, IC 306 includes a memory 308, a control logic 310, a charge pump 312, a demodulator 314, and a modulator 316. An input of charge pump 312, an input of demodulator 314, and an output of modulator 316 are coupled to antenna 304 by antenna signal 328. Note that in the present disclosure, the terms "lead" and "signal" may be used interchangeably to denote the connection between elements or the signal flowing on that connection.

Memory 308 is typically a non-volatile memory, but can alternatively be a volatile memory, such as a DRAM. Memory 308 stores data, including an identification number 318. Identification number 318 typically is a unique identifier (at least in a local environment) for tag 102. For instance, when tag 102 is interrogated by a reader (e.g., receives interrogation signal 110 shown in FIG. 1), tag 102 may respond with identification number 318 to identify itself. Identification number 318 may be used by a computer system to associate tag 102 with its particular associated object/item.

Demodulator 314 is coupled to antenna 304 by antenna signal 328. Demodulator 314 demodulates a radio frequency communication signal (e.g., interrogation signal 110) on antenna signal 328 received from a reader by antenna 304. Control logic 310 receives demodulated data of the radio frequency communication signal from demodulator 314 on input signal 322. Control logic 310 controls the operation of RFID tag 102, based on internal logic, the information received from demodulator 314, and the contents of memory 308. For example, control logic 310 accesses memory 308 via a bus 320 to determine whether tag 102 is to transmit a logical "1" or a logical "0" (of identification number 318) in response to a reader interrogation. Control logic 310 outputs data to be transmitted to a reader (e.g., response signal 112) onto an output signal 324. Control logic 310 may include software, firmware, and/or hardware, or any combination thereof. For example, control logic 310 may include digital circuitry, such as logic gates, and may be configured as a state machine in an embodiment.

Modulator 316 is coupled to antenna 304 by antenna signal 328, and receives output signal 324 from control logic 310. Modulator 316 modulates data of output signal 324 (e.g., one or more bits of identification number 318) onto a radio frequency signal (e.g., a carrier signal transmitted by reader 104) received via antenna 304. The modulated radio frequency signal is response signal 112, which is received by reader 104. In an embodiment, modulator 316 includes a switch, such as a single pole, single throw (SPST) switch. The switch changes the return loss of antenna 304. The return loss may be changed in any of a variety of ways. For example, the RF voltage at antenna 304 when the switch is in an "on" state may be set lower than the RF voltage at antenna 304 when the switch is in an "off" state by a predetermined percentage (e.g., 30 percent). This may be accomplished by any of a variety of methods known to persons skilled in the relevant art(s).

Modulator 316 and demodulator 314 may be referred to collectively as a "transceiver" of tag 102.

Charge pump 312 is coupled to antenna 304 by antenna signal 328. Charge pump 312 receives a radio frequency communication signal (e.g., a carrier signal transmitted by reader 104) from antenna 304, and generates a direct current (DC) voltage level that is output on a tag power signal 326. Tag power signal 326 is used to power circuits of IC die 306, including control logic 320. In such an embodiment, tag 102 may be considered a "passive" tag, as it does not include a battery. In another embodiment, tag 102 may include a battery. In such an embodiment, tag 102 may be considered an "active" tag.

In an embodiment, charge pump 312 rectifies the radio frequency communication signal of antenna signal 328 to create a voltage level. Furthermore, charge pump 312 increases the created voltage level to a level sufficient to power circuits of IC die 306. Charge pump 312 may also include a regulator to stabilize the voltage of tag power signal 326. Charge pump 312 may be configured in any suitable way known to persons skilled in the relevant art(s). For description of an example charge pump applicable to tag 102, refer to U.S. Pat. No. 6,734,797, titled "Identification Tag Utilizing Charge Pumps for Voltage Supply Generation and Data Recovery," which is incorporated by reference herein in its entirety. Alternative circuits for generating power in a tag are also applicable to embodiments of the present invention.

It will be recognized by persons skilled in the relevant art(s) that tag 102 may include any number of modulators, demodulators, charge pumps, and antennas. Tag 102 may additionally include further elements, including an impedance matching network and/or other circuitry. Embodiments of the present invention may be implemented in tag 102, and in other types of tags. For example, in another embodiment, tag 102 may be a surface acoustic wave (SAW) type tag, or similar tag, that communicates in a passive fashion.

Embodiments described herein are applicable to all forms of tags, including tag "inlays" and "labels." A "tag inlay" or "inlay" is defined as an assembled RFID device that generally includes an integrated circuit chip (and/or other electronic circuit) and antenna formed on a substrate, and is configured to respond to interrogations. A "tag label" or "label" is generally defined as an inlay that has been attached to a pressure sensitive adhesive (PSA) construction, or has been laminated, and cut and stacked for application. Another example form of a "tag" is a tag inlay that has been attached to another surface, or between surfaces, such as paper, cardboard, etc., for attachment to an object to be tracked, such as an article of clothing, etc.

Example embodiments of the present invention are described in further detail below. Such embodiments may be implemented in the environments and readers described above, and/or in alternative environments and alternative RFID devices.

Example RFID Tag Embodiments

Methods, systems, and apparatuses are described below for tracking items having associated RFID tags, and for updating information based on a physical context of the items. The example embodiments described herein are provided for illustrative purposes, and are not limiting. Further structural and operational embodiments, including modifications/alterations, will become apparent to persons skilled in the relevant art(s) from the teachings herein.

Embodiments of the present invention have many advantages. For instance, currently, when items having associated RFID tags change their physical context (e.g., change location, etc.), updates to related data have to be made manually (e.g., by operator keyboard entry) to a related database that stores tracking and/or other information regarding the item, and to the tag, if the tag is also to be updated. Conventionally, changes to information based on a change in physical context of an item are made first in the database, and subsequently in the tag. Embodiments of the present invention enable the changes to information to first occur in the tag, and subsequently in the database, although the changes can occur in the opposite order if desired. Furthermore, in embodiments, the changes to information can be made automatically.

Figure 4A:
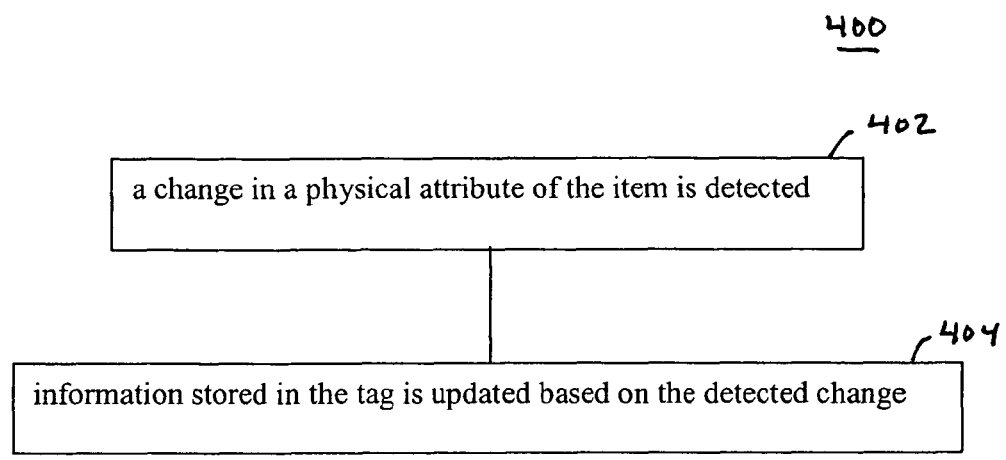
FIGS. 4A and 4B show example steps for tracking an item having an associated RFID tag, according to example embodiments of the present invention.

FIG. 4A shows a flowchart 400 providing example steps for tracking an item having an associated RFID tag, according to example embodiments of the present invention. Flowchart 400 is described below with respect to an example tracking system 500 shown in FIG. 5, for illustrative purpose. Other structural and operational embodiments will be apparent to persons skilled in the relevant art(s) based on the following discussion.

Figure 5:
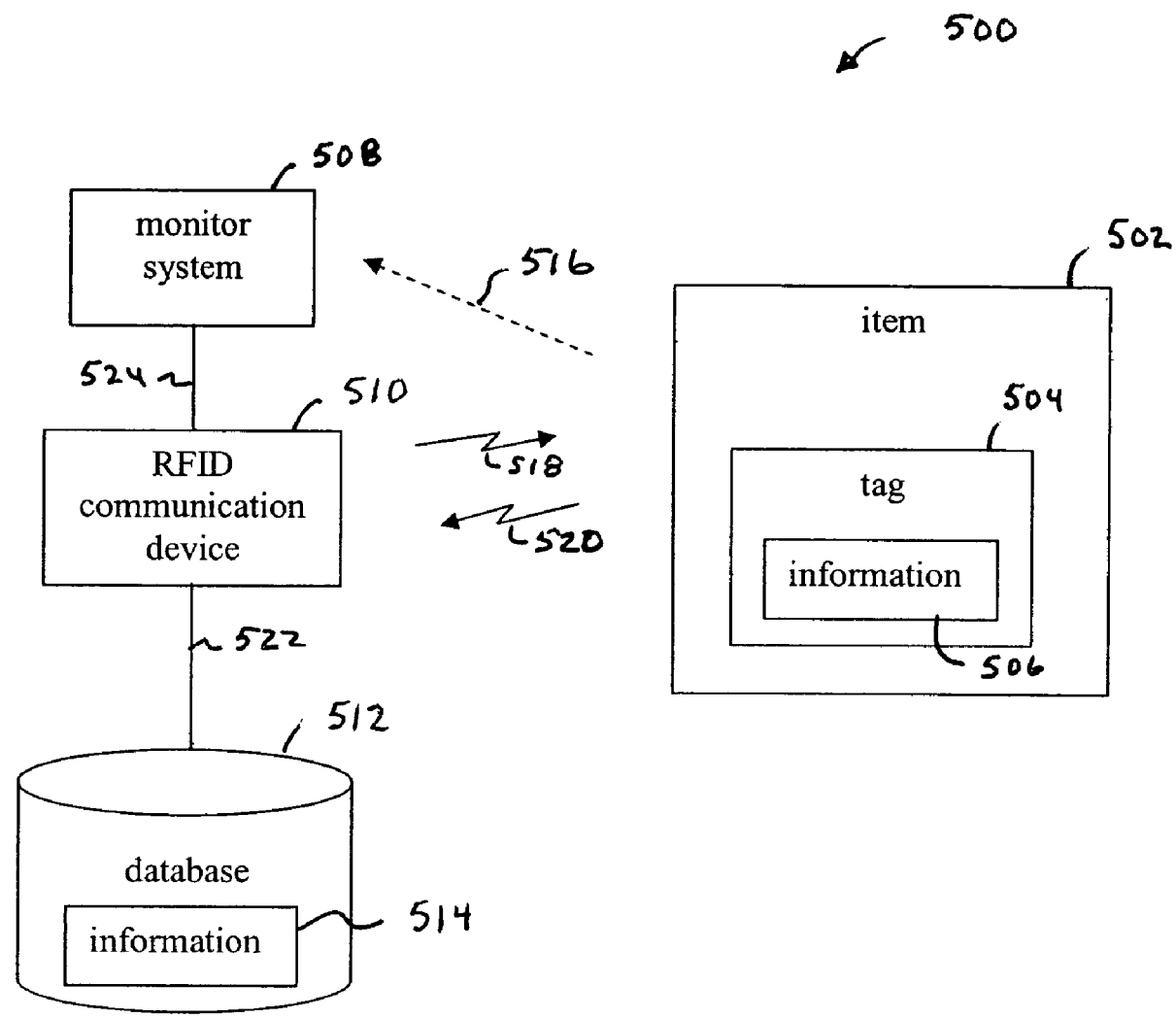
FIG. 5 shows an example tracking system, according to an embodiment of the present invention.

Flowchart 400 begins with step 402. In step 402, a change in a physical attribute of the item is detected. For example, FIG. 5 shows an item 502 that has undergone a change in a physical attribute. Item 502 may be any type of item or object, such as a consumer good (e.g., baggage, a food container, an article of clothing, etc.), packaging (e.g., a box or crate), or other item. Item 502 has an associated (e.g., attached, nearby) tag 504. Tag 504 may be any type of tag, including the tag types described above or other type of tag. As shown in FIG. 5, tag 504 stores information 506. For instance, in the example tag of FIG. 3, information 506 can be stored in memory 308. Information 506 can be any type of information. For example, information 506 may be location information, price information, velocity information, and/or other information.

According to step 402, a change in a physical attribute of item 502 may be detected. For example, as shown in FIG. 5, tracking system 500 includes a monitor system 508 that may be used to detect a change in a physical attribute of item 502, according to an embodiment of the present invention. As shown in FIG. 5, monitor system 508 receives a physical attribute change 516 from item 502. Physical attribute change 516 may be any detected change in a physical attribute of item 502, such as a change in position, temperature, velocity, etc., of item 502. Example embodiments for step 402 and for monitor system 508 are described in further detail below.

In step 404 shown in FIG. 4A, information stored in the tag is updated based on the detected change. For instance, as shown in FIG. 5, tracking system 500 includes a RFID communication device 510 that may be used to update information 506 stored in tag 504. RFID communication device 510 is coupled to monitor system 508 by communication link 524. Monitor system 508 uses communication link 524 to provide to RFID communication device 510 an indication of the detected change. In an example embodiment, RFID communication device 510 includes a RFID tag data writer/programmer. Based on the detected change, RFID communication device 510 may transmit a write signal 518 to tag 504 containing updated information to be written into information 506. Tag 504 receives write signal 518, and writes the updated information into information 506. Tag 504 may optionally transmit a response signal 520, which includes a confirmation that the updated information was successfully written into information 506. Example embodiments for step 404 and for RFID communication device 510 are described in further detail below.

Figure 4B:
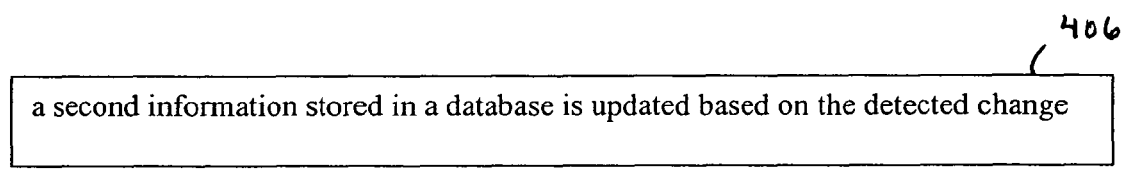

FIG. 4B shows an optional additional step 406 for flowchart 400 in some embodiments. In step 406, a second information stored in a database is updated based on the detected change. For instance, as shown in FIG. 5, tracking system 500 includes a database 512 that stores a second information 514. Database 512 is shown coupled to RFID communication device 510 in FIG. 5 by a communication link 522. Alternatively, database 512 may be directly coupled to monitor system 508 by communication link 522. The same or different information may be stored in step 406 as was stored as first information 506 in step 404 due to the detected change of step 402. Example embodiments for step 406 and for database 512 are described in further detail below.

Note that communication links 522 and 524 may be wired and/or wireless communication links. For example, links 522 and 524 may include a local area network (LAN) or wide area network (WAN), such as the Internet.

A variety of attributes may be considered a physical attribute of item 502, including a location of item 502. For example, the location attribute may be a location of item 502 in a two- or three-dimensional space, a height of item 502, a location of item 502 in a store, building, or other structure, a location of item 502 in a storage rack, etc. Further example physical attributes of item 502 include a temperature of item 502, a velocity of item 502, etc. Note that the value or change of a physical attribute of item 502 may be detected by directly or indirectly determining the change in the physical attribute with regard to item 502. For example, the change may be indirectly determined by determining the change with regard to the local environment of item 502 or by determining the change with regard to tag 504, rather than directly with regard to item 502. For example, step 402 may include determining a location of tag 504, a temperature of the local environment or of tag 504, and/or a velocity of tag 504, depending on the particular embodiment.

Figure 6:
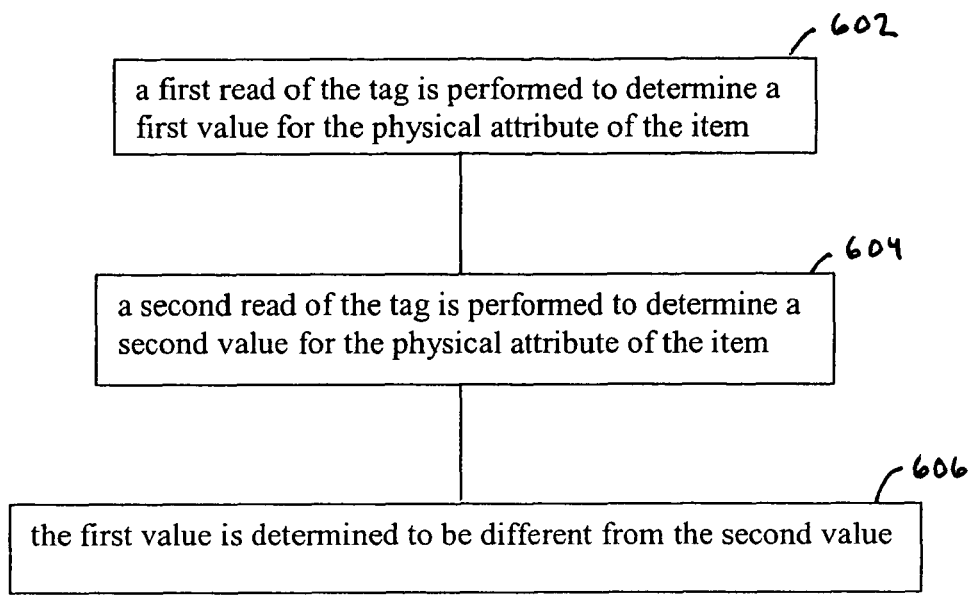
FIG. 6 shows a flowchart providing example steps for detecting a change in a physical attribute of an item, according to an embodiment of the present invention.
Figure 7:
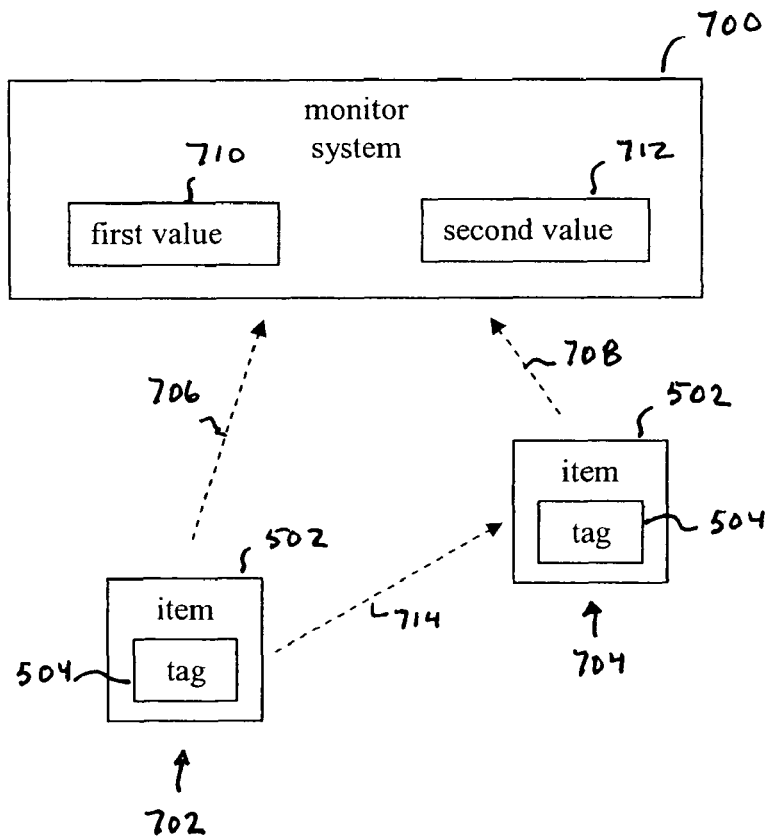
FIGS. 7-12 show example monitor systems, according to embodiments of the present invention.

Step 402 may be performed in a variety of ways. For example, FIG. 6 shows example steps that may be performed for step 402, according to an embodiment of the present invention. FIG. 7 shows a monitor system 700, which is an example of monitor system 500 of FIG. 5, that may be used to perform the steps shown in FIG. 6 with regard to detecting a location attribute of item 502. Monitor system 700 may include various types of monitors configured to detect a change in a location of item 502. In an embodiment, monitor system 700 may communicate with a global positioning system (GPS) to detect a change in a location of item 502. Alternatively, monitor system 700 may include one or more RFID readers (such as those described further above, or other type) to detect a change in a location of item 502. In further embodiments, other types of monitors may be present in monitor system 700 to detect a change in a location of item 502, such as motion detectors or other monitor types, as would be known to persons skilled in the relevant art(s).

In step 602, a first read of the tag is performed to determine a first value for the physical attribute of the item. For example, FIG. 6 shows monitor system 700 receiving a first response signal 706 from tag 504 of item 502 located at a first location 702. First response signal 706 provides an indication of a location of item 502 at the time first location signal 706 is received. The location is stored as first value 710 in monitor system 700. Subsequently to step 602, item 502 moves from first location 702 to a second location 704 (as indicated by arrow 714).

In step 604, a second read of the tag is performed to determine a second value for the physical attribute of the item. FIG. 6 FIG. 7 shows monitor system 700 receiving a second response signal 708 from tag 504 of item 502 located at second location 704. Second response signal 708 provides an indication of a location of item 502 at the time second response signal 708 is received. This location is stored as second value 712 in monitor system 700.

In step 606, the first value is determined to be different from the second value. For example, monitor system 700 may include a comparator for comparing first value 710 and second value 712. If first value 710 is different from second value 712, a change in the location of item 502 is detected.

Figure 8:
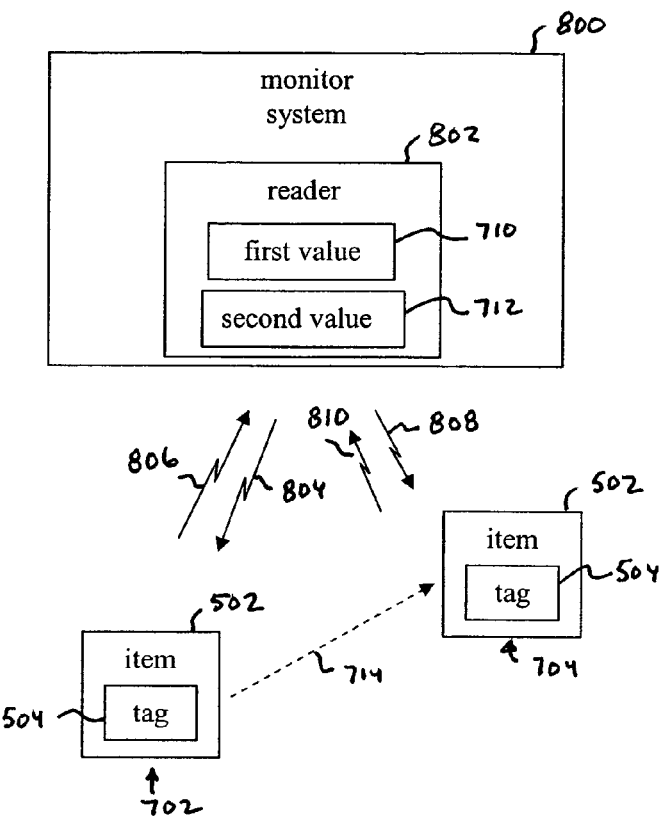

FIG. 8 shows a monitor system 800, as an example of monitor system 700, that includes a single reader 802 used to detect a change in a location of item 502. As shown in FIG. 8, reader 802 performs step 602 by transmitting a first read or interrogation signal 804 to item 502, and receiving a first response signal 806 from tag 504, to determine an indication of the location of item 502 (at first location 702), which is stored as first value 710. Reader 802 performs step 604 by transmitting a second read or interrogation signal 808 to item 502, and receiving a second response signal 810 from tag 504, to determine a second indication of the location of item 502 (at second location 704), which is stored as second value 712.

In an embodiment, reader 802 stores a read rate and/or a strength of response signals 806 and 810 received from tag 504 at both of first and second locations 702 and 704, and compares them, to determine whether a change in location of item 502 has occurred. For example, a read rate (i.e., a rate of successful reads) of tag 504 may change from first location 702 to second location 704 due to a change in a distance to tag 504 from reader 802 (e.g., read rate will decline as tag 504 moves further away), a change in obstacles in the environment around tag 504 due to the move (e.g., causing reflections, etc.), and other conditions changed due to moving item 502. Likewise, the strength of response signal 810 may be greater than that of response signal 806, because tag 504 is closer to reader 802 at location 704 than at location 702.

Figure 9:
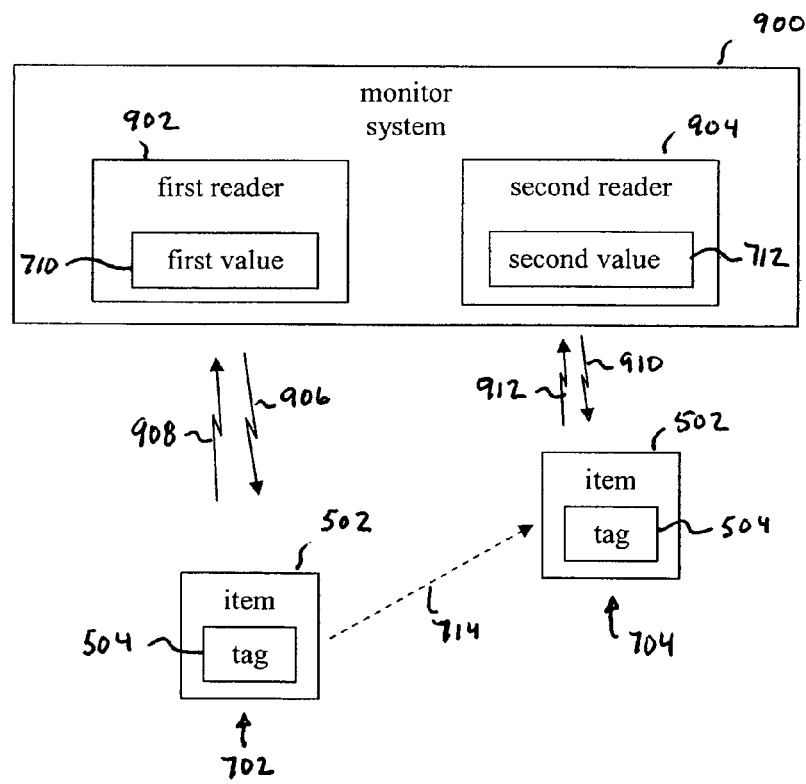

In another embodiment, FIG. 9 shows a monitor system 900, as an example of monitor system 700, that includes a plurality of readers 902 and 904 used to detect a change in a location of item 502. As shown in FIG. 9, first reader 902 performs step 602 by transmitting a first read or interrogation signal 906 to item 502, and receiving a first response signal 908 from tag 504, to determine a first indication of the location of item 502 (at first location 702), which is stored as first value 710. Second reader 904 performs step 604 by transmitting a second read or interrogation signal 910 to item 502, and receiving a second response signal 912 from tag 504, to determine a second indication of the location of item 502 (at second location 704), which is stored as second value 712. In an embodiment, readers 902 and 904 are located at physically different locations such that first reader 902 does not receive tag responses from tags at second location 704, and second reader 904 does not receive tag responses from tags at first location 702. Thus, when first reader 902 records a read of tag 504, and second reader 904 subsequently records a read of tag 504, a change of location of item 502 is thereby detected. Alternatively, reader 902 and reader 904 may be physically located close enough to receive tag responses from second and first locations 704 and 702, respectively, but at lower signal strengths than would be received from first and second locations 702 and 704, respectively. Thus, because first reader 902 receives first tag response signal 908 more strongly than does second reader 904, and second reader receives second tag response signal 912 more strongly than does first reader 902, a change of location of item 502 can thereby be detected.

Figure 10:
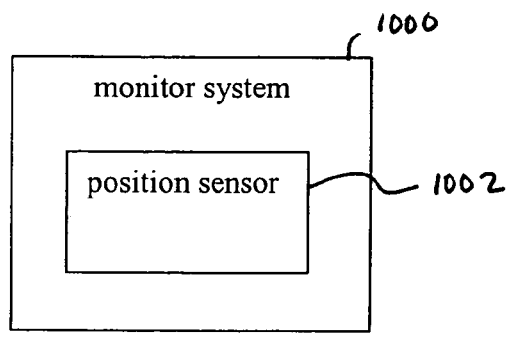
Figure 11:
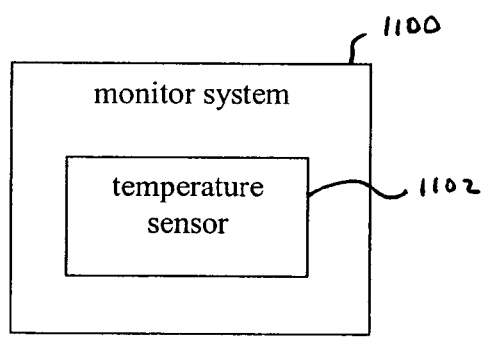
Figure 12:
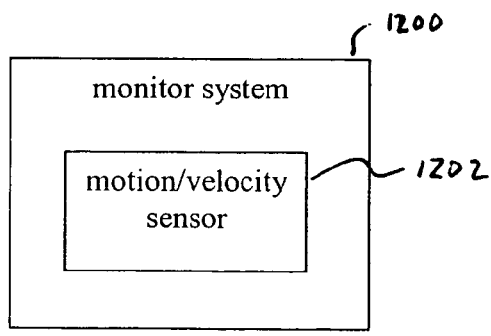

The example monitor systems of FIGS. 5 and 7-9 can be adapted to the detecting of changes in a variety of physical attributes. For example, FIGS. 10-12 show example monitor systems for detecting changes in various types of physical attributes, according to embodiments of the present invention. FIG. 10 shows a monitor system 1000 that includes a position sensor 1002 for detecting a change in a position/location of item 502. Position sensor 1002 can include the location monitors configurations of monitor systems 508, 700, 800, and 900. Furthermore, position sensor 1002 can include other types of position/location monitors, such as a proximity sensor, ultrasonic range sensor, etc. For example, in an example embodiment, position system 1002 may include an imaging system for optically detecting a change in a position of item 502. In another embodiment, position system 1002 may include a sound-sensing system for acoustically detecting a change in a position of item 502. In still another embodiment, position sensor 1002 may use global positioning system (GPS) capability to detect a change in a position/location of item 502. Monitor system 1000 may include a communications network, such as a LAN, WAN, WLAN, etc., that includes location determining capability, to detect a change in position/location of item 502.

A tracking system incorporating position sensor 1002 can be used in a variety of applications. For example, in a retail store application, a tracking system, such as tracking system 500 of FIG. 5, incorporating position sensor 1002 can be used to update item pricing. For instance, information 506 stored in tag 504 may include a price of item 502. According to an embodiment, the price stored in tag 504 may be desired to be changed based on a location of item 502 in the store. For example, the store may have a sidewalk sale. Employees of the store may move item 502 from a first location in the store, where tag 504 stores a first price value for item 502, to a second location of the store, such as a sidewalk outside the store, where it is desired to have a second price value for item 502. Monitor system 508 may include a reader network, such as shown for monitor system 900 shown in FIG. 9. Similarly to the description provided above, first and second readers 902 and 904 may sense that item 502 moved from the first location (e.g., in the store) to the second location (e.g., the sidewalk). At the second location, if second reader 904 has tag-write capability, second reader 904 may write updated price information to be stored as information 506 in tag 504 of item 502, according to step 404. For example, a 25% discount may be applied to items, including item 502, which have been moved to the sidewalk for the sidewalk sale. The updated price information may be additionally transmitted to database 512 for storage as information 514, according to step 406 above, if desired.

In a further embodiment, information 506 of tag 504 may include a location identification (ID) which may be updated in information 506 (as well as in information 514) in an analogous manner as for price information described above, after item 502 is moved from inside the store to the sidewalk.

For example, tag 504 may store a location ID in information 514 that indicates a shelf location of item 502 within a planogram. The location of the item 502 within the planogram is updated in tag 504 and/or database 512 as described above. Retailers may be provided with the location information, including the changes in the location information, to analyze the location information and gauge sales performance of item 502 based on its location. For example, the location information may enable both the retailer and item vendor to create improved merchandising plans. The location information informs the retailer and/or vendor which locations tend to sell out, and thus may need to be replenished more frequently, and which locations have relatively poorer sales performance.

FIG. 11 shows a monitor system 1100 that includes a temperature sensor 1102 for detecting a change in a temperature of item 502 (such as by determining a change in the temperature of an environment in which item 502 is located, as described above). For example, temperature sensor 1102 may include a thermometer, a thermocouple, a thermostat, or a temperature sensitive resistor or other active or passive component. A tracking system incorporating temperature sensor 1102 can be used in a variety of applications. For example, in a retail store application, a tracking system such as tracking system 500 of FIG. 5 incorporating temperature sensor 1102 can be used to update item pricing based on temperature. For instance, as described above, information 506 stored in tag 504 may include a price of item 502. According to an embodiment, the price stored in tag 504 may be changed based on a temperature of the environment and/or of item 502. For example, as weather becomes colder in the winter, tags 504 associated with items 502 identified as high volume sellers in cold weather may be increased or decreased in price as a promotion. Price information of information 506 in tag 504 may be accordingly updated (according to step 404). The updated price information may be transmitted to database 512 for storage as information 514, according to step 406 above, if desired.

FIG. 12 shows a monitor system 1200 that includes a motion/velocity sensor 1202 for detecting a change in a velocity of item 502. For example, motion/velocity sensor 1202 may include a velocity sensor such as a radar (e.g., a radar gun), a laser-based velocity sensor, etc. A tracking system incorporating motion/velocity sensor 1202 can be used in a variety of applications. For example, a tracking system, such as tracking system 500 of FIG. 5, incorporating motion/velocity sensor 1202 can be used to monitor speed of vehicles (e.g., cars, trucks) on the road. For instance, information 506 stored in tag 504 may include velocity information of a vehicle that is item 502. According to an embodiment, the velocity of the vehicle can be periodically measured and stored in tag 504 as information 506, according to step 404 above. The velocity information may be transmitted to database 512 for storage as information 514, according to step 406 above. This velocity information may be used by law enforcement, car maintenance entities, etc.

In another embodiment, in step 404, information 506 in tag 504 may be replaced with information already stored in tag 504 based on the change detected in step 402. For example, an information element may be selected from a plurality of information elements stored in the tag, based on the detected change. Information 506 may then be replaced with the selected information element. For example, item 502 may be a posted sign having an electronic display. Tag 504 may store a plurality of information elements that may be displayed by the electronic display. The particular information element to be displayed may be selected based on context sensitive information, such as temperature, location, etc.

Figure 13:
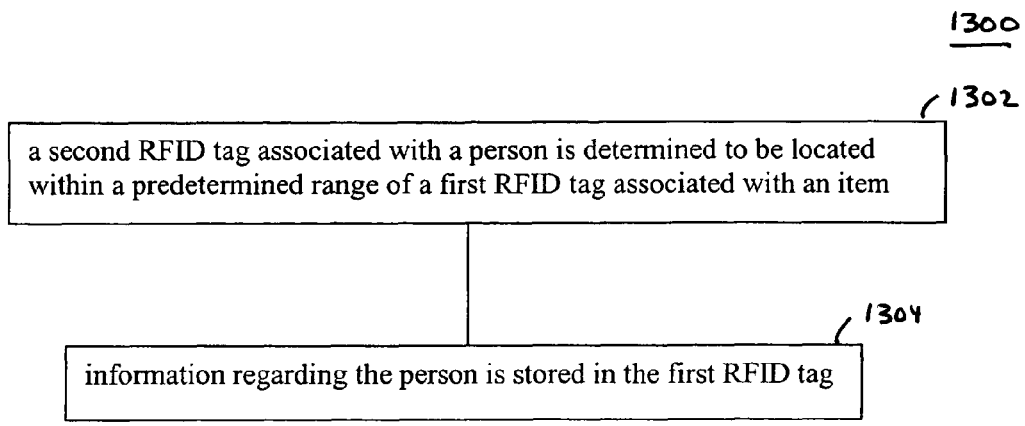
FIG. 13 shows a flowchart providing example steps for tracking an item having an associated RFID tag, according to an example embodiment of the present invention.
Figure 14:
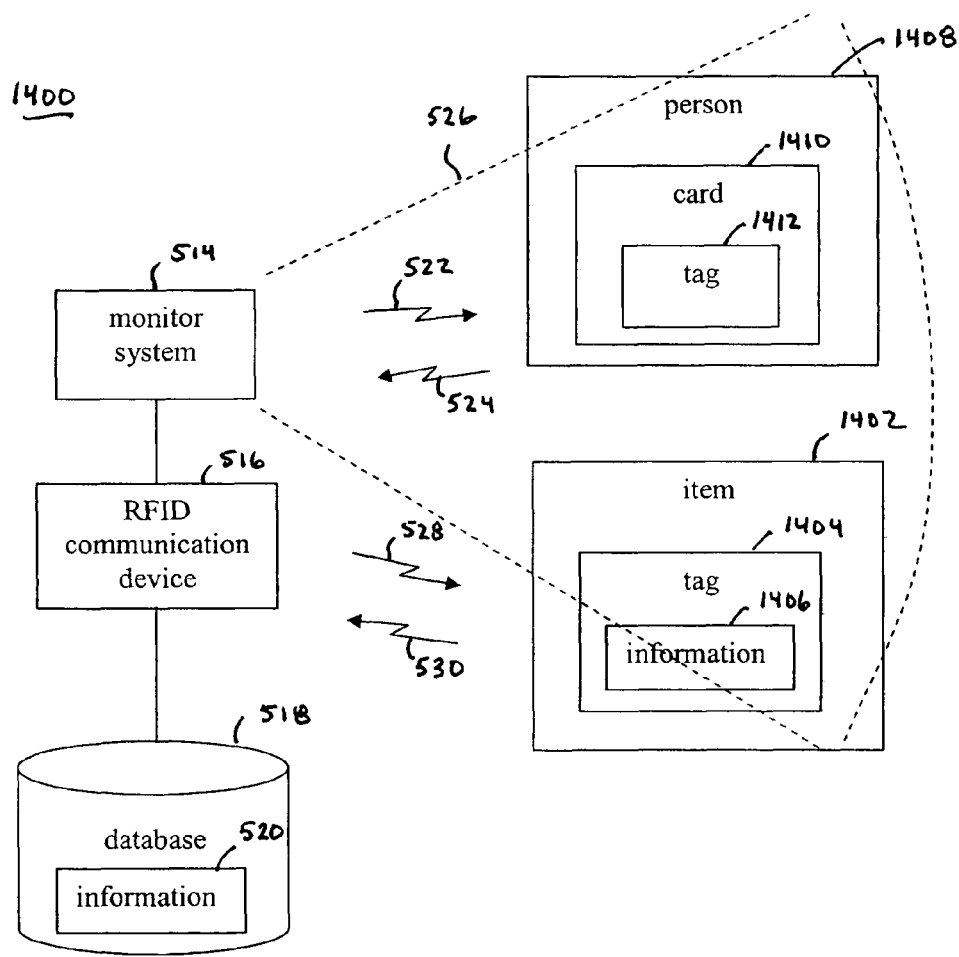
FIGS. 14 and 15 show example tracking systems, according to embodiments of the present invention.

In another embodiment, changes to information in a first tag associated with an item are enabled based on a proximity of the item to a second tag associated with a person. FIG. 13 shows a flowchart 1300 providing example steps for tracking an item having an associated RFID tag, according to example embodiments of the present invention. Flowchart 1300 is described below with respect to an example tracking system 1400 shown in FIG. 14, for illustrative purpose. As shown in FIG. 14, tracking system 1400 includes monitor system 514, RFID communication device 516, and database 518. Other structural and operational embodiments will be apparent to persons skilled in the relevant art(s) based on the following discussion.

Flowchart 1300 begins with step 1302. In step 1302, a second RFID tag associated with a person is determined to be located within a predetermined range of a first RFID tag associated with an item. For example, FIG. 14 shows an item 1402 having an associated tag 1404. Similarly to item 502 described above, item 1402 may be any type of item or object, such as a consumer good (e.g., baggage, a food container, an article of clothing, etc.), packaging (e.g., a box or crate), or other item. Tag 1404 may be any type of tag, including being a tag described above or other type of tag. As shown in FIG. 14, tag 1404 stores information 1406. For example, information 1406 may be location information, price information, velocity information, and/or other information.

FIG. 14 also shows a person 1408 having an associated electronic card 1410. Electronic card 1410 may be a conventional or proprietary electronic card, such as a credit card, identification card, drivers license, etc. Electronic card 1410 includes a tag 1412. Tag 1412 enables monitor system 514 to determine a presence of card 1410, and thus a presence of person 1408. For example, in FIG. 14, monitor system 514 includes reader functionality, and has a reader communication range 526. Thus, if person 1408 is within communication range 526, monitor system 514 can read tag 1412 of card 1410 to determine that person 1408 is within communication range 526. For instance, as shown in FIG. 14, monitor system 514 transmits a read or interrogation signal 522. Tag 1412 responds to interrogation signal 522 by transmitting a response signal 524. In an embodiment, monitor system 514 also reads tag 1404 of item 1402 to determine a presence of item 1402. In this manner, monitor system 514 is configured to determine that tag 1412 of person 1408 is within a predetermined range of tag 1406 of item 1402 (e.g., both within a communication range of monitor system 514, which may be a few feet, or other distance), according to step 1302.

Figure 15:
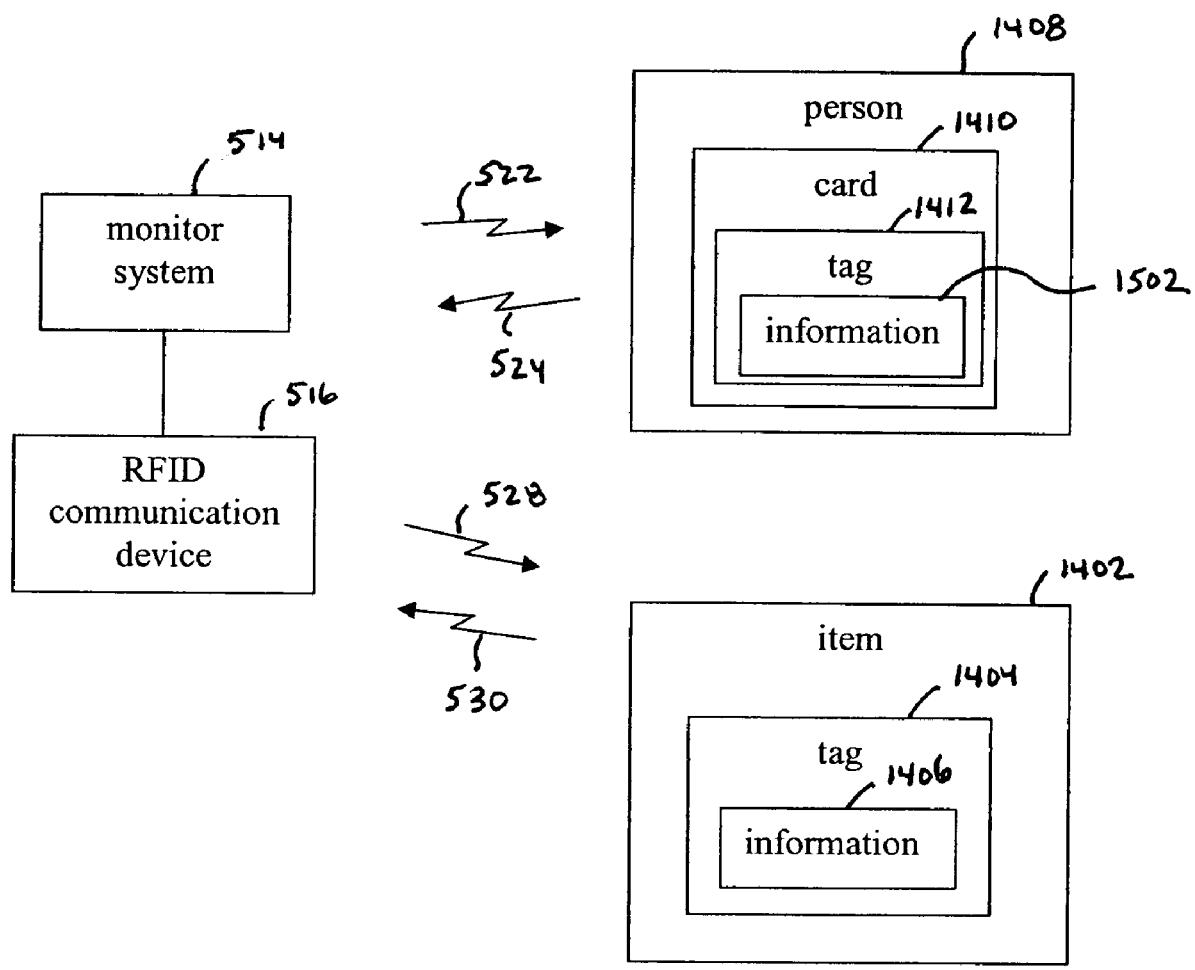

In step 1304, information regarding the person is stored in the first RFID tag. For example, the information is stored in the first RFID tag if the second RFID tag is determined to be within the predetermined range according to step 1302. In an embodiment, information to be stored in tag 1404 is first read from tag 1412. For example, as shown in FIG. 15, monitor system 514 may read information 1502 from tag 1412 of card 1410. Such information may include information about personal attributes and/or shopping habits of person 1408. RFID communication device 516 writes information 1502 to information 1406 of tag 1404 of item 1402. Alternatively, RFID communication device 516 writes other information to tag 1406.

For example, as shown in FIG. 14, RFID communication device 516 may transmit a write signal 528 to tag 1404 containing updated information to be written into information 1406. Tag 1404 receives write signal 1428, and writes the updated information into information 1406. Tag 1404 may optionally transmit a response signal 1430, which may include a confirmation that the updated information was successfully written into information 1406.

In an embodiment, monitor system 514 may monitor one or more attributes of person 1408, to determine information regarding person 1408. The determined information can be written to tag 1404 of item 1402 to be stored as information 1406. A variety of attributes of person 1408 may be determined by monitor system 514. For example, an amount of time that person 1408 is within the predetermined range may be monitored, and/or other attribute, and stored in tag 1404. In a retail environment example, tag 1404 may be located on a store shelf where promotional items are located. It would be useful for retailers to know that a given profile of customers have stopped by the shelf location, including those customers that did not purchase item 1402. This may indicate that the promotional promise is working, but that item 1402 is not attractive when it is seen, touched, or otherwise interacted with by customers. Retailers generally are able to obtain a profile of customers who buy items with shopper cards after they pass through checkout. However, retailers have a more difficult time determining what items at the store the customers would have liked to buy, but did not. Such items represent lost revenue and could be ordered for the future by the retailer. In this example, tag 1404 may aid the retailer in determining what items customers interact with, but do not purchase, by at least determining a profile of such customers that interact with item 1402.

In an embodiment, as shown in FIG. 14, the information may also be stored in database 518 as information 520.

Example Computer System Embodiments

In this document, the terms "computer program medium" and "computer usable medium" are used to generally refer to media such as a removable storage unit, a hard disk installed in hard disk drive, and signals (i.e., electronic, electromagnetic, optical, or other types of signals capable of being received by a communications interface). These computer program products are means for providing software to a computer system. The invention, in an embodiment, is directed to such computer program products.

In an embodiment where aspects of the present invention are implemented using software, the software may be stored in a computer program product and loaded into a computer system using a removable storage drive, hard drive, or communications interface. The control logic (software), when executed by a processor, causes the processor to perform the functions of the invention as described herein.

According to an example embodiment, a device may execute computer-readable instructions to monitor items and/or persons, locate RFID tags, to update data stored in tags, to update tag/item related data stored in a database, and/or to perform other functions, as further described elsewhere herein.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for tracking an item having an associated radio frequency identification (RFID) tag, comprising:
   performing a first read of the tag with a RFID communication device to determine a first value for a physical attribute of the item;
   performing a second read of the tag with the RFID communication device to determine a second value for the physical attribute of the item;
   detecting a change based on whether the first value is different from the second value; and
   updating a first information stored in the tag based on the detected change with the RFID communication device.

2. The method of claim 1, further comprising:
   updating a second information stored in a database based on the detected change.

3. The method of claim 1, wherein the physical attribute is a location of the item, wherein said detecting comprises:
   detecting a change in the location of the item using a position sensor.

4. The method of claim 3, wherein said detecting a change in the location of the item comprises:
   performing a first read of the tag by a first reader having a first location; and
   performing a second read of the tag by a second reader having a second location.

5. The method of claim 3, wherein said detecting a change in the location of the item comprises:
   detecting a change in the location of the item using a position sensor within a building.

6. The method of claim 3, wherein said detecting a change in the location of the item comprises:
   detecting a change in a height at which the item is located using a position sensor.

7. The method of claim 3, wherein the first information comprises a price of the item, wherein said updating the first information stored in the tag based on the detected change in the location of the item comprises:
   changing the price information stored in the tag based on the detected change.

8. The method of claim 1, wherein the physical attribute is a temperature of the item, wherein said detecting comprises:
   detecting a change in the temperature of the item.

9. The method of claim 1, wherein the physical attribute is a velocity of movement of the item, wherein said detecting comprises:

detecting a change in the velocity of movement of the item.

10. The method of claim 8, wherein the first information comprises velocity information of the item, wherein said updating the first information stored in the tag based on the detected change comprises:

storing a velocity of the item in the tag.

11. The method of claim 1, wherein the first information comprises a price of the item, wherein said updating the first information stored in the tag based on the detected change comprises:

updating the price stored in the tag with an updated price.

12. The method of claim 1, wherein the first information comprises location information of the item, wherein said updating the first information stored in the tag based on the detected change comprises:

updating the location information stored in the tag with a current location of the item.

13. The method of claim 1, wherein said updating comprises:

selecting an information element from a plurality of information elements stored in the tag based on the detected change; and replacing the first information with the selected information element.

14. The method of claim 13, further comprising:

displaying the selected information element.

15. A system for tracking an item having an associated radio frequency identification (RFID) tag, comprising:

a RFID communication device performing a first read of the tag to determine a first value for a physical attribute of the item and performing a second read of the tag to determine a second value for the physical attribute of the item; and a monitor system coupled to the RFID communication system for detecting a change based on whether the first value is different from the second value, wherein the RFID communication device is configured to update a first information stored in the tag based on the detected change.

16. The system of claim 15, further comprising:

a network communication device coupled to the monitor module and configured to update a second information stored in a database based on the detected change.

17. The system of claim 16, wherein the network communication device is coupled to the database over a communications network.

18. The system of claim 15, wherein the physical attribute is a location of the item.

19. The system of claim 18, wherein the monitor system comprises a RFID reader.

20. The system of claim 19, wherein the reader configured to detect a change in location of the item using a position sensor by reading the RFID tag.

21. The system of claim 19, wherein the monitor system comprises a first reader located at a first location and a second reader located at a second location, wherein the first reader and second reader are each configured to transmit read signals directed to the RFID tag to cooperatively determine the location of the item.

22. The system of claim 15, wherein the physical attribute is a temperature of the item, wherein the monitor system comprises a temperature sensor.

23. The system of claim 15, wherein the physical attribute is a velocity of the item, wherein the monitor system comprises a velocity sensor.

24. The system of claim 15, wherein the RFID communication device is a tag data writer configured to transmit updated information to the RFID tag to replace the first information stored in the RFID tag.

25. The system of claim 15, wherein the RFID communication device is configured to transmit a command to the RFED tag to replace the first information stored in the RFID tag with a second information stored in the RFID tag.

* * * * *

UNITED STATES PATENT AND TRADEMARK OFFICE
CERTIFICATE OF CORRECTION

| | | |
|---|---|---|
| PATENT NO. | : 7,760,095 B2 | Page 1 of 1 |
| APPLICATION NO. | : 11/639237 | |
| DATED | : July 20, 2010 | |
| INVENTOR(S) | : Murrah | |

It is certified that error appears in the above-identified patent and that said Letters Patent is hereby corrected as shown below:

1. In Column 9, Lines 33-34, delete "FIG. 6 FIG. 7" and insert -- FIG. 6 and FIG. 7 --, therefor.

2. In Column 16, Line 36, in Claim 25, delete "RFED" and insert -- RFID --, therefor.

Signed and Sealed this
Twenty-ninth Day of November, 2011

David J. Kappos
*Director of the United States Patent and Trademark Office*